US012711656B2

(12) United States Patent
Hao

(10) Patent No.: US 12,711,656 B2
(45) Date of Patent: Aug. 18, 2026

(54) METHOD AND APPARATUS FOR POSITIONING TARGET OBJECT, DEVICE AND STORAGE MEDIUM

(71) Applicant: BEIJING GEEKPLUS TECHNOLOGY CO., LTD., Beijing (CN)

(72) Inventor: Yuefan Hao, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/125,030

(22) PCT Filed: Nov. 21, 2023

(86) PCT No.: PCT/CN2023/132785

§ 371 (c)(1),
(2) Date: Apr. 28, 2025

(87) PCT Pub. No.: WO2024/120172

PCT Pub. Date: Jun. 13, 2024

(65) Prior Publication Data

US 2026/0112053 A1 Apr. 23, 2026

(30) Foreign Application Priority Data

Dec. 9, 2022 (CN) ......................... 202211578417.7
Dec. 14, 2022 (CN) ........................ 202211609084.X
Jul. 19, 2023 (CN) ......................... 202310889463.7

(51) Int. Cl.
*G06T 7/73* (2017.01)
*B25J 9/16* (2006.01)

(52) U.S. Cl.
CPC ............... *G06T 7/73* (2017.01); *B25J 9/1697* (2013.01)

(58) Field of Classification Search
CPC ................................ G06T 7/73; B25J 9/1697
See application file for complete search history.

(56) References Cited

U.S. PATENT DOCUMENTS 11,084,410 B1 * 8/2021 Bhaskaran .............. B66F 17/00
2015/0332213 A1 * 11/2015 Galluzzo .............. G06Q 10/087 700/218

(Continued)

FOREIGN PATENT DOCUMENTS

CN 106125738 11/2016
CN 106556341 4/2017

(Continued)

OTHER PUBLICATIONS

CNIPA, Notification to Grant Patent Right for Invention for CN Application No. 202310889463.7, May 29, 2025.

(Continued)

*Primary Examiner* — Wassim Mahrouka
(74) *Attorney, Agent, or Firm* — Hodgson Russ LLP

(57) ABSTRACT

A method for positioning a target object includes: obtaining image information of a position to be identified on a shelf after transporting the shelf to a workstation; calculating first position information of the position to be identified in a first coordinate system based on the image information of the position to be identified; obtaining second position information of the position to be identified in a second coordinate system; calculating a conversion relationship between the first and second coordinate systems based on the first and second position information; and obtaining third position information of the target object to be transported on the shelf in the second coordinate system, determining fourth position information of the target object to be transported relative to the container picking device based on the third position information and the conversion relationship, and picking up (Continued)

after a transfer robot transports a shelf to a workstation, image information of a position to be identified in the shelf collected by a visual scanning device is obtained — 202 based on the image information of the position to be identified, first position information of the position to be identified in a first coordinate system is calculated — 204 second position information of the position to be identified in a second coordinate system is obtained — 206 a conversion relationship between the first coordinate system and the second coordinate system is calculated based on the first position information and the second position information — 208 third position information of at least one target object to be transported on the shelf in the second coordinate system is obtained, fourth position information of the target object to be transported relative to the container picking device is determined based on the third position information and the conversion relationship, and the fourth position information is sent to the control device, so as to trigger the control device to control the mechanical arm to pick up the target object to be transported based on the fourth position information — 210 the target object to be transported based on the fourth position information.

13 Claims, 9 Drawing Sheets

(56) References Cited

U.S. PATENT DOCUMENTS

| | | | | |
|---|---|---|---|---|
| 2019/0302787 | A1* | 10/2019 | Li | G06Q 10/06316 |
| 2020/0042932 | A1 | 2/2020 | Kosaka et al. | |
| 2024/0067450 | A1* | 2/2024 | Zhao | B65G 1/1373 |

FOREIGN PATENT DOCUMENTS

| | | |
|---|---|---|
| CN | 111178317 | 5/2020 |
| CN | 111243015 | 6/2020 |
| CN | 113052517 | 6/2021 |
| CN | 113290552 | 8/2021 |
| CN | 113800167 | 12/2021 |
| CN | 113936010 | 1/2022 |
| CN | 114065881 | 2/2022 |
| CN | 114148662 | 3/2022 |
| CN | 114820781 | 7/2022 |
| CN | 217457334 | 9/2022 |
| CN | 116902467 | 10/2023 |
| CN | 118172526 | 6/2024 |
| EP | 4002243 | 5/2022 |
| JP | 2010089844 | 4/2010 |
| WO | 2021063328 | 4/2021 |
| WO | 2021249406 | 12/2021 |
| WO | 2021249572 | 12/2021 |
| WO | 2022176800 | 8/2022 |
| WO | 2022237221 | 11/2022 |

OTHER PUBLICATIONS

WIPO, International Search Report and Written Opinion for PCT/CN2023/132785, Jan. 12, 2024.

EPO, Extended European Search Report for EP Application No. 23899751.4, Feb. 23, 2026.

* cited by examiner

METHOD AND APPARATUS FOR POSITIONING TARGET OBJECT, DEVICE AND STORAGE MEDIUM

CROSS-REFERENCE TO RELATED APPLICATIONS

This application is a national stage entry under 35 U.S.C. § 371 of International Application No. PCT/CN2023/132785, filed on Nov. 21, 2023, which claims priority to Chinese Application No. 202211609084.X, filed on Dec. 14, 2022, Chinese Application No. 202310889463.7, filed on Jul. 19, 2023, and Chinese Application No. 202211578417.7 filed on Dec. 9, 2022, The entire disclosures of the above-identified applications are hereby incorporated herein by reference.

FIELD

The present disclosure relates to the technical field of robots, in particular to a method and an apparatus for positioning a target object, a device and a storage medium.

BACKGROUND

In a warehouse environment, when transporting a container on a shelf in the warehouse, the shelf with multiple containers usually are first transported to a preset fixed position of a workstation by the moving robot, and then a corresponding container is picked by a mechanical arm in a container picking device in the workstation, so that the container is transported to a target position.

SUMMARY

According to embodiments of a first aspect of the present disclosure, a method for positioning a target object is provided, and the method is performed by a terminal. The terminal is respectively coupled with a control device and a visual scanning device on a container picking device, and the control device is coupled with a mechanical arm on the container picking device. The method includes: obtaining image information of a position to be identified on a shelf collected by the visual scanning device after a transfer robot transports the shelf to a workstation, in which the position to be identified includes a identifier to be identified and/or a target compartment opening, the identifier to be identified includes at least one of a visual identification code arranged on the shelf, a corner of the shelf and an intersection position of compartment openings in the shelf, and the number of visual identification codes arranged on the shelf is smaller than the number of the compartment openings in the shelf; and the target compartment opening includes a compartment opening for placing a target object to be transported: calculating first position information of the position to be identified in a first coordinate system based on the image information of the position to be identified, in which the first coordinate system is a coordinate system constructed based on the visual scanning device; obtaining second position information of the position to be identified in a second coordinate system, in which the second coordinate system is a coordinate system constructed based on the shelf; calculating a conversion relationship between the first coordinate system and the second coordinate system based on the first position information and the second position information; and obtaining third position information of the target object to be transported on the shelf in the second coordinate system, determining fourth position information of the target object to be transported relative to the container picking device based on the third position information and the conversion relationship, and sending the fourth position information to the control device, to trigger the control device to control the mechanical arm to pick up the target object to be transported based on the fourth position information.

According to embodiments of a second aspect of the present disclosure, an apparatus for positioning a target object is provided, and includes: a first obtaining module configured to obtain image information of a position to be identified on a shelf collected by a visual scanning device after a transfer robot transports the shelf to a workstation, in which the position to be identified includes a identifier to be identified and/or a target compartment opening, the identifier to be identified includes at least one of a visual identification code arranged on the shelf, a corner of the shelf and an intersection position of compartment openings in the shelf, the number of visual identification codes arranged on the shelf is smaller than the number of the compartment openings in the shelf, and the target compartment opening includes a compartment opening for placing a target object to be transported: a first calculation module configured to calculate first position information of the position to be identified in a first coordinate system based on the image information of the position to be identified, in which the first coordinate system is a coordinate system constructed based on the visual scanning device: a second obtaining module configured to obtain second position information of the position to be identified in a second coordinate system, in which the second coordinate system is a coordinate system constructed based on the shelf: a second calculation module configured to calculate a conversion relationship between the first coordinate system and the second coordinate system based on the first position information and the second position information; and a determination module configured to obtain third position information of at least one target object to be transported on the shelf in the second coordinate system, determine fourth position information of the target object to be transported relative to the container picking device based on the third position information and the conversion relationship, and send the fourth position information to a control device, to trigger the control device to control a mechanical arm to pick up the target object to be transported based on the fourth position information.

According to embodiments of a third aspect of the present disclosure, an electronic device (compute device) is provided, and includes: a memory configured to store computer-executable instructions; and a processor configured to read the instructions from the memory and execute the instructions to realize the method according to the first aspect and any implementation of the first aspect.

According to embodiments of a fourth aspect of the present disclosure, a computer-readable storage medium is provided, in which computer instructions are stored, and the computer instructions are configured to cause the computer to perform the method according to the first aspect and any implementation of the first aspect.

According to embodiments of a fifth aspect of the present disclosure, a computer program product is provided, which includes a computer program stored in a computer-readable storage medium, and the computer program includes program instructions which, when executed by a computer, cause the computer to perform the method according to any implementation of the first aspect.

BRIEF DESCRIPTION OF THE DRAWINGS

In order to explain the technical scheme of the embodiments of the present disclosure more clearly; the accompanying drawings needed to be used in the embodiments will be briefly introduced below: Obviously, the accompanying drawings described below are only some embodiments of the present disclosure, and other drawings may be obtained according to these drawings without creative work for those ordinary skilled in the related art.

FIG. 9 is another flow chart for selecting a preset target point according to some embodiments of the present disclosure.

FIG. 10 is a flow chart for calculating second position information according to an embodiment of the present disclosure.

DETAILED DESCRIPTION

Figure 1:
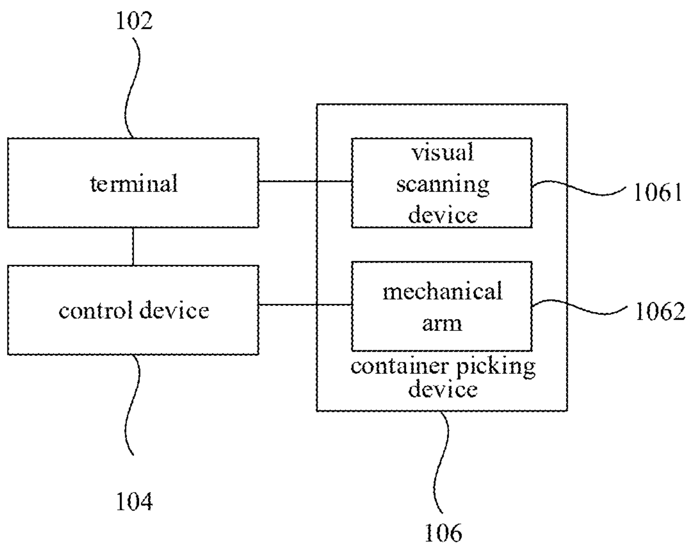
FIG. 1 is a schematic diagram of a scene of a method for positioning a target object according to some embodiments of the present disclosure.

In order to make those skilled in the related art better understand the technical scheme in embodiments of the present disclosure, and make the above objectives, features and advantages of the embodiments of the present disclosure more obvious and understandable, the technical scheme in the embodiments of the present disclosure will be further explained in detail with reference to accompanying drawings.

In a warehouse environment, when transporting a container on a shelf in the warehouse, the shelf with multiple containers usually are first transported to a preset fixed position of a workstation by the moving robot, and then a corresponding container is picked by a mechanical arm in a container picking device in the workstation, so that the container is transported to a target position. However, due to abnormality of a motion control system of the transfer robot itself and an installation error of a ground identification code that guides the transfer robot to move, an actual position where the transfer robot places the shelf will have a certain deviation from the preset fixed position, so that the mechanical arm in the container picking device cannot pick the corresponding container. Therefore, it is necessary to accurately locate a current position of the container.

Generally, in order to accurately locate a current position of a container when transporting the container on a shelf, a visual identification code is usually arranged at each compartment opening where the container is placed on the shelf. After roughly positioning a target object to be transported through preset position information, a visual scanning device in a container picking device is used to obtain image information of a visual identification code at a compartment opening where the target object to be transported is placed, and then position information of the target object to be transported relative to the visual scanning device is calculated based on the image information. Since the visual scanning device is installed on the container picking device and their relative position relationship is known, accurate position information of the target object to be transported relative to the container picking device may be calculated, and then a mechanical arm may be controlled to pick the target object to be transported based on the position information. However, since it is necessary to arrange one visual identification code at each compartment opening, the cost of installing the visual identification code will increase. In addition, all the target objects to be transported on the shelf may be accurately positioned only after the image information of the visual identification code at each compartment opening is collected, which reduces the efficiency of container positioning.

Therefore, the embodiments of the present disclosure provide a method and a device for position a target object, an apparatus and a storage medium. By identifying a position to be identified including at least one of a visual identification code, a corner of a shelf and an intersection position of compartment openings in the shelf, and a target compartment opening in the shelf, position information of a target object to be transported relative to a container picking device may be determined, so that a position of the target object to be transported relative to the container picking device may be determined without installing the visual identification code on the shelf or only by installing a small number of visual identification codes on the shelf. Since there is no need to install one visual identification code at each compartment opening in the shelf, the manufacturing cost and installation cost of the visual identification code may be reduced. In addition, since image information of an identifier to be identified only needs to be collected once, and the position information of all the target objects to be transported (such as containers) on the shelf may be determined at one time through the calculated conversion relationship, the efficiency of positioning the target object to be transported is improved.

The method for positioning the target object provided by the embodiments of the present disclosure is performed by a terminal. FIG. 1 is a schematic diagram of a scene of a method for positioning a target object according to some embodiments of the present disclosure. As shown in FIG. 1, a terminal 102 is respectively coupled with a control device 104 and a visual scanning device 1061 on a container picking device 106, and the control device 104 is coupled with a mechanical arm 1062 on the container picking device 106.

An upper business system is arranged in the terminal 102, and the terminal 102 is configured to execute the method for positioning the target object provided by the following embodiments of the present disclosure.

The visual scanning device 1061 may be a camera, which may be a 2D camera or a 3D camera. The visual scanning device 1061 is configured to scan and identify a position to be identified in a shelf (such as a visual identification code, a corner of the shelf, an intersection position of compartment openings in the shelf or a target compartment opening) and collect image information of the position to be identified.

The control device 104 may include a programmable logic controller (PLC). The control device 104 is configured to receive position information of a target object to be transported relative to the container picking device sent by the terminal 102, and control the mechanical arm 1062 to pick the target object to be transported in the shelf based on the position information. The mechanical arm 1062 may be a suction type mechanical arm or other types of mechanical arms, which is not limited by the embodiments of the present disclosure.

Figure 2:
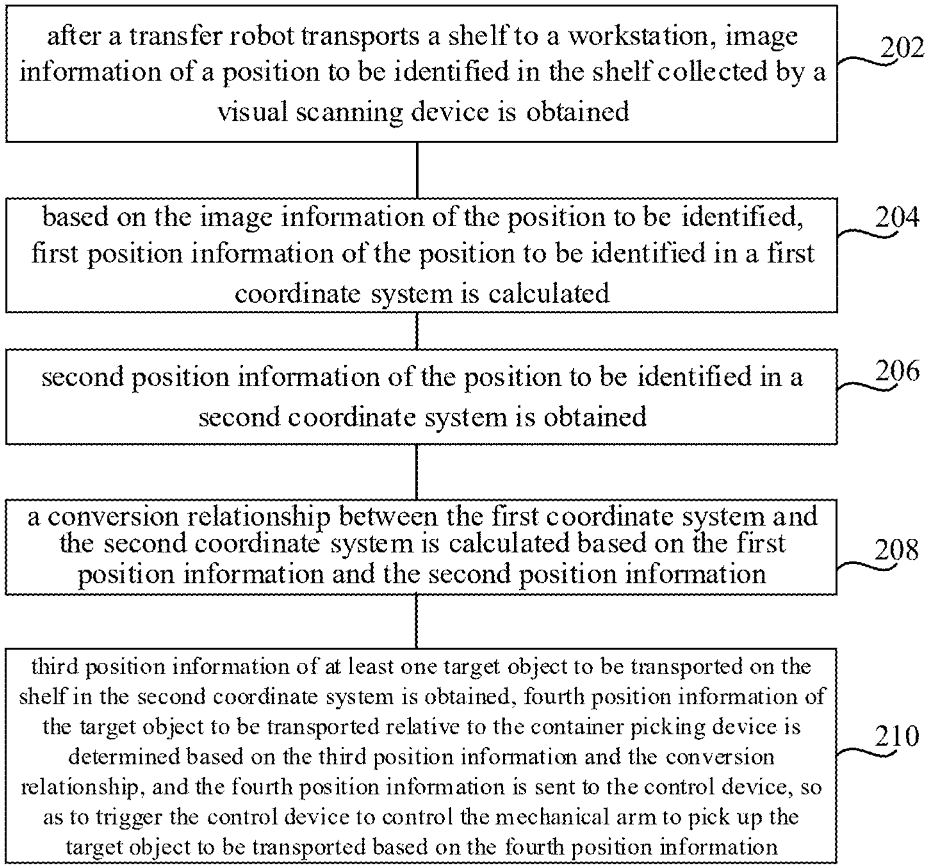
FIG. 2 is a flow chart of a method for positioning a target object according to some embodiments of the present disclosure.

The technical scheme provided by the embodiments of the present disclosure will be described in detail with reference to the accompanying drawings. FIG. 2 is a flow chart of a method for positioning a target object according to some embodiments of the present disclosure, and the method includes the following steps.

In step 202, after a transfer robot transports a shelf to a workstation, image information of a position to be identified in the shelf collected by a visual scanning device is obtained.

The position to be identified includes an identifier to be identified and/or a target compartment opening, and the identifier to be identified includes at least one of a visual identification code arranged in the shelf, a corner of the shelf and an intersection position of compartment openings in the shelf. When the identifier to be identified includes the visual identification code arranged in the shelf, the number of the visual identification codes arranged in the shelf is less than the number of the compartment openings in the shelf.

In a warehouse system, a plurality of shelves are usually arranged, each shelf has a plurality of compartment openings, and each compartment opening is used to place a container, an original container, a material container, a receptacle, goods and the like.

In some embodiments, there is no need to arrange visual identification code on the shelf, and the corner of the shelf and/or the intersection position of the compartment openings in the shelf may be used as the position to be identified, or the target compartment opening may be used as the position to be identified. The target compartment opening includes a compartment opening for placing the target object to be transported.

In some embodiments, the visual identification codes whose number is less than the number of the compartment openings in the shelf may be arranged on the shelf, and the visual identification codes may be used as the identifiers to be identified on the shelf. In other embodiments, the visual identification code and the corner of the shelf may be used as the identifiers to be identified on the shelf. Alternatively, the visual identification code and the intersection position of the compartment openings in the shelf may also be used as the identifiers to be identified on the shelf. Alternatively, the visual identification code, the corner of the shelf and the intersection position of the compartment openings in the shelf may also be used as the identifiers to be identified on the shelf together.

For example, four or more identifiers to be identified may be arranged, and positions of the individual identifiers to be identified are not in a straight line. The more the identifiers to be identified, the more accurate the determined position of the target object to be transported is. The embodiments of the present disclosure do not limit the number of the identifiers to be identified.

In an embodiment, in a case that the position to be identified is the identifier to be identified, the identifier to be identified may include the corner of the shelf. When the identifier to be identified only includes the corner of the shelf, the number of the corners of the shelf is greater than or equal to four. For example, the identifier to be identified includes four corners of a front area of the shelf, or four corners of a top area of the shelf. For another example, the identifier to be identified may also include four corners of a side area of the shelf. When the identifier to be identified includes not only the corner of the shelf, but also the intersection position of the compartment openings in the shelf and/or the visual identification code, the number of the corners of the shelf may be less than four. The embodiments of the present disclosure do not limit the positions and the number of the corners of the shelf included in the identifier to be identified, and the position of the corner of the shelf included in the identifier to be identified is related to an installation position of the visual scanning device.

Figure 3A:
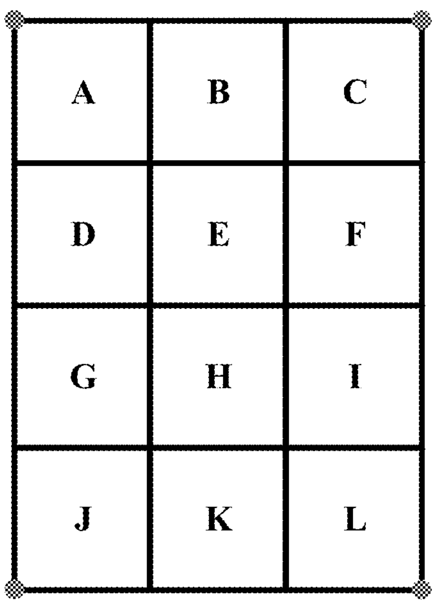
FIG. 3A is a schematic diagram of a front area of a shelf including an identifier to be identified according to some embodiments of the present disclosure.

For example. FIG. 3A is a schematic diagram of a front area of a shelf including an identifier to be identified. As shown in FIG. 3A, gray dots in FIG. 3A represent four corners of the front area of the shelf, and the identifiers to be identified on the shelf may be the four corners of the front area of the shelf.

In an embodiment, the identifier to be identified includes the intersection position of the compartment openings in the shelf. When the identifier to be identified only includes the intersection position of the compartment openings in the shelf, the number of the intersection positions of the compartment openings in the shelf is greater than or equal to four. For example, the identifier to be identified includes at least four intersection positions of the compartment openings located in the front area of the shelf, or at least four intersection positions of the compartment openings located in the top area of the shelf. For another example, the identifier to be identified may also include at least four intersection positions of the compartment openings located in the side area of the shelf. When the identifier to be identified includes not only the intersection position of the compartment openings, but also the corner of the shelf and/or the visual identification code, the number of the intersection positions of the compartment openings may be less than four. The embodiments of the present disclosure do not limit the position and number of the intersection positions of the compartment openings included in the identifier to be identified, and the intersection position of the compartment openings included in the identifier to be identified is related to the installation position of the visual scanning device.

Figure 3B:
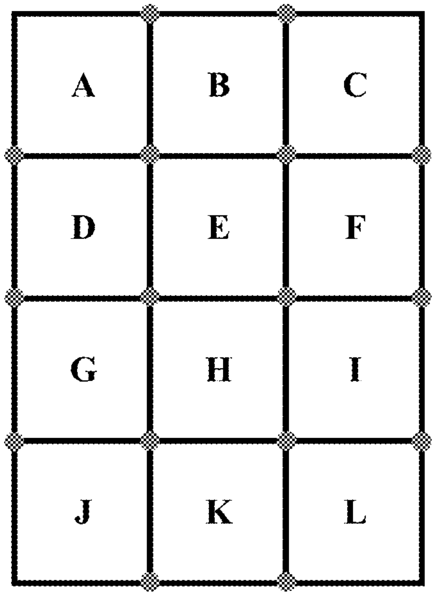
FIG. 3B is another schematic diagram of a front area of a shelf including an identifier to be identified according to some embodiments of the present disclosure.

For example. FIG. 3B is another schematic diagram of a front area of a shelf including an identifier to be identified according to some embodiments of the present disclosure. As shown in FIG. 3B, the shelf includes compartment openings A to L, each of intersection points of the compartment openings is the identifier to be identified, and gray dots in FIG. 3B all represent the identifiers to be identified.

In an embodiment, the identifier to be identified may include both the corner of the shelf and the intersection position of the compartment openings in the shelf. For example, the identifier to be identified includes the corner of the front area of the shelf and the intersection position of the compartment openings of the front area of the shelf. For another example, the identifier to be identified includes the corner of the top area of the shelf and the intersection position of the compartment openings of the top area of the shelf.

In an embodiment, the identifier to be identified may also be the visual identification code. The visual identification code is an identification code used for positioning, and generally may be an Apriltag code. The Apriltag code serves as a visual positioning identifier, and is similar to a two-dimensional code or a barcode. Of course, an ArUco code may also be used, which is not limited by the embodiments of the present disclosure. The principle of using the Apriltag code and the ArUco code for positioning is the prior art, and will not be described here.

Figure 3C:
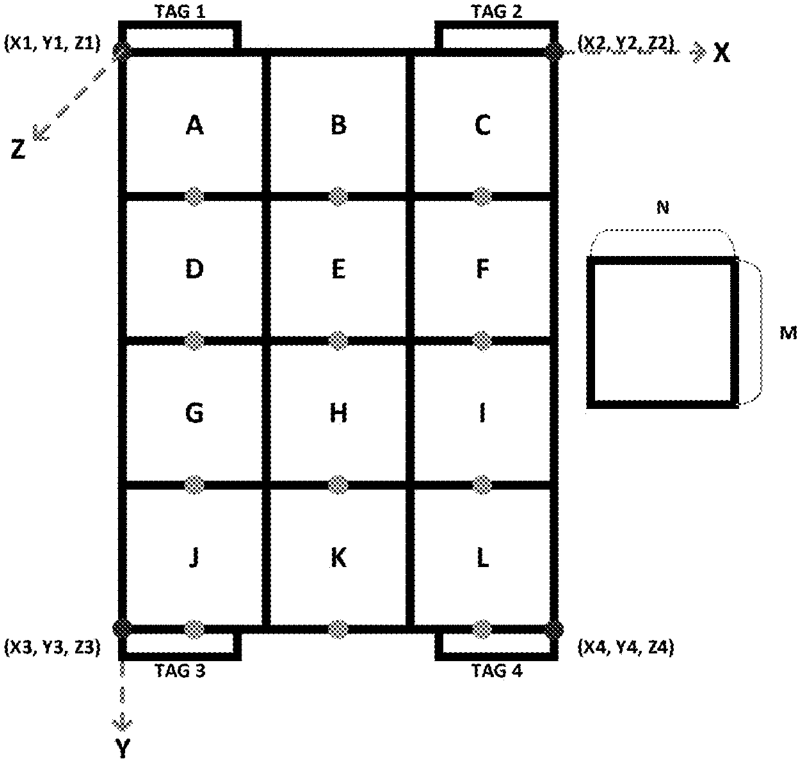
FIG. 3C is a schematic diagram of arranging a visual identification code in a front area of a shelf according to some embodiments of the present disclosure.

When the identifier to be identified includes the visual identification code, the number of the visual identification codes installed on the shelf is less than the number of the compartment openings in the shelf in the embodiments of the present disclosure, so that it is not necessary to install one visual identification code at each compartment opening of the shelf. FIG. 3C is a schematic diagram of arranging a visual identification code in a front area of a shelf according to an embodiment of the present disclosure. As shown in FIG. 3C, the shelf includes a compartment opening A to a compartment opening L. and a gray dot below each compartment opening represents the visual identification code corresponding to the compartment opening, that is, one visual identification code needs to be arranged at each compartment opening. However, in the embodiment of the present disclosure, the number of the visual identification codes arranged on the shelf is smaller than the number of the compartment openings in the shelf, and the embodiment of the present disclosure does not limit the positions of the visual identification codes arranged on the shelf.

In some embodiments, the number of the visual identification codes may be greater than four and less than the number of the compartment openings in the shelf, and the individual visual identification codes are respectively arranged at four corners of the front area of the shelf and at least one preset target position of the top area of the shelf, or the individual visual identification codes are respectively arranged at four corners of the top area of the shelf and at least one preset target position of the front area of the shelf.

The preset target position includes a corner position and a center position. The following description is made by taking an example that the individual visual identification codes are arranged at the four corners of the front area of the shelf and the four corners of the top area of the shelf.

Since the position information of the shelf may be determined by the visual identification codes at the four corners of the front area or by the visual identification codes at the four corners of the top area, the two pieces of determined position information may be compared. For example, a difference of the two pieces of determined position information may be obtained by comparison. When the difference is less than a preset threshold, it indicates that the determined position information of the shelf is accurate. When the difference is greater than the preset threshold, it indicates that the determined shelf position information of the shelf is inaccurate. At this time, it is possible to re-check whether the installation position of the visual identification code is deviated, so that the manufacturing cost and installation cost of the visual identification code may be reduced, and also the accuracy of container positioning may be improved.

In some embodiments, four visual identification codes may be provided, and the individual visual identification codes may be arranged at the four corners of the front area or the top area of the shelf, respectively. Continuing to refer to FIG. 3C, it may be seen that the dot at each of the four corners of the shelf represents one visual identification code, and the four visual identification codes may be identified as TAG1. TAG2. TAG3 and TAG4, respectively.

Figure 4A:
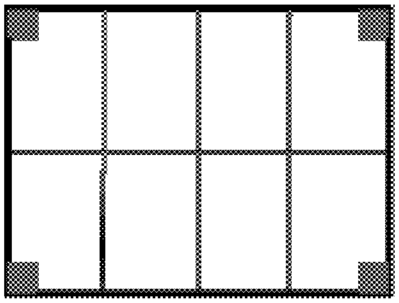
FIG. 4A is a schematic diagram of arranging a visual identification code in a top area of a shelf according to some embodiments of the present disclosure.

FIG. 4A is a schematic diagram of arranging a visual identification code in a top area of a shelf according to some embodiments of the present disclosure. As shown in FIG. 4A, four visual identification codes on the shelf are represented by small rectangular boxes located at four corners. By using four visual identification codes, all the target objects to be transported on the shelf may be located, which greatly reduces the manufacturing cost and installation cost of visual identification codes, and also reduces the maintenance cost of visual identification codes in the later stage. The embodiments of the present disclosure does not limit the positions and number of visual identification codes arranged on the shelf, and the arrangement positions of the visual identification codes are related to the installation position of the visual scanning device, as long as the number of the arranged visual identification codes is less than the number of the compartment openings in the shelf.

In some other embodiments, three visual identification codes may be provided, and the individual visual identification codes are arranged at any three corners of the front area or the top area of the shelf, respectively. Since a plane where the whole shelf is located may still be determined through the three visual identification codes, the position information of the shelf may be determined.

In some other embodiments, two visual identification codes may be provided, and the individual visual identification codes are respectively arranged at two corners located at a diagonal in the front area or the top area of the shelf. One visual identification code may also be provided, and the visual identification code is arranged at a center of the front area or the top area of the shelf. By combining the two visual identification codes or one visual identification code with size information of the shelf, the position information of the shelf may be determined, and in addition, the manufacturing cost and installation cost of the visual identification code are further reduced.

When the position to be identified is the target compartment opening, the target compartment opening may be any compartment opening in the shelf or a compartment opening in the shelf for placing the target object to be transported. The target object to be transported may be a container, an original container, a material container, a receptacle, goods and other target objects, and of course, may also be other target objects in the shelf, which is not limited by the embodiment of the present disclosure.

For example, any compartment opening in the shelf may serve as the position to be identified, so as to determine the position of the target object to be transported relative to the container picking device: or, the compartment opening for placing the target object to be transported may also serve as the position to be identified, so as to determine the position of the target object to be transported relative to the container picking device, which is not limited by the embodiment of the present disclosure. Since the container picking device moves to the compartment opening where the target object to be transported is placed when the container picking device is to pick up the target object to be transported on the shelf, the image information of the compartment opening where the target object to be transported is placed (such as the target compartment opening) may be collected by the visual scanning device, so as to determine the position of the target object to be transported relative to the container picking device.

In some examples, since the shelf on which the target object is placed may be deformed, or the size of the compartment opening on the shelf deviates from a preset size due to the manufacturing process, in order to further improve the positioning accuracy of the target object to be transported, the compartment opening for placing the target object to be transported may serve as the position to be identified, so as to determine the position of the target object to be transported relative to the container picking device.

In an embodiment, the visual scanning device may be a camera, which may be a 2D camera or a 3D camera. The visual scanning device is used to scan and identify the identifier to be identified and/or the target compartment opening on the shelf, so as to collect the image information of the position to be identified. After the transfer robot transports the shelf to the workstation, a control instruction may be sent to the visual scanning device to control the visual scanning device to collect the image information of the position to be identified. It should be noted that the collected image information of the position to be identified may also include image information of objects around the position to be identified.

It should be noted that when the identifier to be identified is the visual identification code, the realization way of obtaining the position information of the target object to be transported relative to the container picking device is similar to the realization way of obtaining the position information of the target object to be transported relative to the container picking device when the identifier to be identified is the corner of the shelf and/or the intersection position of the compartment openings in the shelf. The following embodiments illustrate the realization way of obtaining the position information of the target object to be transported relative to the container picking device by taking an example that the position to be identified includes the visual identification code or the target compartment opening respectively.

In step 204, based on the image information of the position to be identified, first position information of the position to be identified in a first coordinate system is calculated.

The first coordinate system is a coordinate system constructed based on the visual scanning device.

In an embodiment, taking an example that the position to be identified includes the visual identification code, continuing to refer to FIG. 3C, the position information of the four visual identification codes in the first coordinate system may be expressed as follows: $PTAG1_{Camera}$=(X1,Y1,Z1), $PTAG2_{Camera}$=(X2,Y2,Z2), $PTAG3_{Camera}$=(X3,Y3,Z3), $PTAG4_{Camera}$=(X4,Y4, Z4), respectively. Since the position to be identified includes the corner of the shelf and/or the intersection position of the compartment openings in the shelf, the way of obtaining the first position information of the corner of the shelf and/or the intersection position of the compartment openings in the shelf in the first coordinate system is similar to the way of obtaining the position information of the visual identification code in the first coordinate system, and thus the details are not repeated here.

In an embodiment, taking an example that the position to be identified includes the target compartment opening, the above step 204 includes calculating first position information of a preset target point on the target compartment opening in the first coordinate system based on image information of the target compartment opening.

Figure 4B:
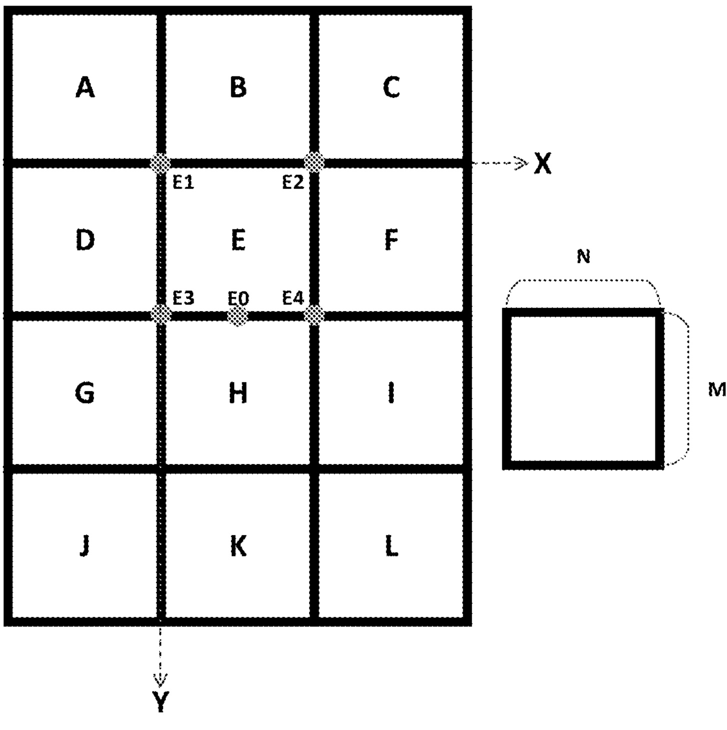
FIG. 4B is a schematic diagram of four vertices of a target compartment opening according to some embodiments of the present disclosure.

In some embodiments, the preset target point may include four vertices of the target compartment opening. FIG. 4B is a schematic diagram of four vertices of a target compartment opening according to some embodiments of the present disclosure. As shown in FIG. 4B, taking an example that the target compartment opening is a compartment opening E, four vertices of the target compartment opening E are E1, E2, E3 and E4 respectively, and E1, E2, E3 and E4 may serve as preset target points. When the visual scanning device is a 2D camera, two-dimensional image information including four vertices of the target compartment opening in the shelf collected by the 2D camera may be obtained.

Figure 4C:
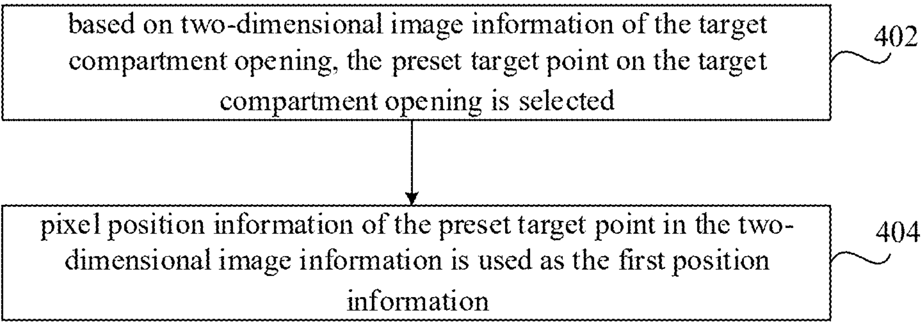
FIG. 4C is a flow chart for calculating first position information according to some embodiments of the present disclosure.

FIG. 4C is a flow chart for calculating first position information according to some embodiments of the present disclosure. As shown in FIG. 4C, the method includes the following steps.

In step 402, based on two-dimensional image information of the target compartment opening, the preset target point on the target compartment opening is selected.

The two-dimensional image information of the target compartment opening may include not only the image information of the compartment opening, but also the image information of other objects, so it is necessary to select the four vertices of the target compartment opening according to the two-dimensional image information.

Figure 5:
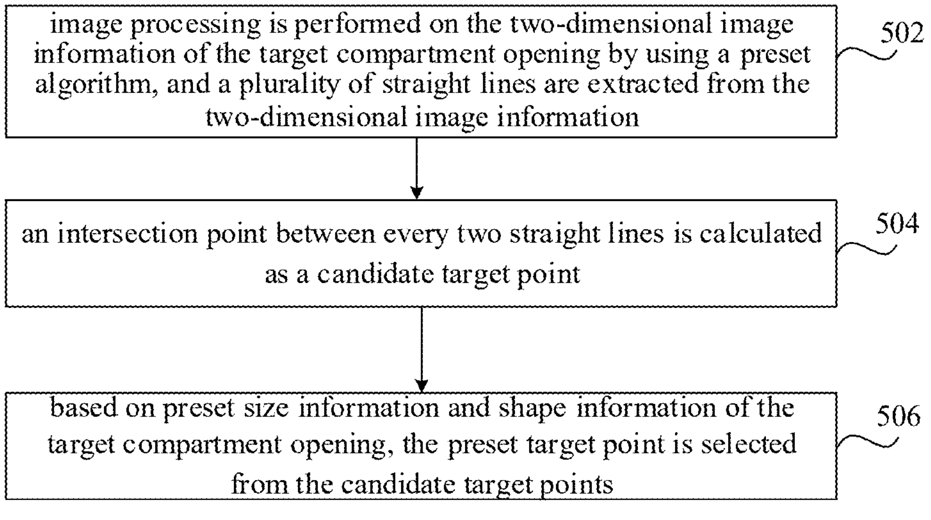
FIG. 5 is a flow chart for selecting a preset target point according to some embodiments of the present disclosure.

FIG. 5 is a flow chart for selecting a preset target point according to some embodiments of the present disclosure. As shown in FIG. 5, the method includes the following steps.

In step 502, image processing is performed on the two-dimensional image information of the target compartment opening by using a preset algorithm, and a plurality of straight lines are extracted from the two-dimensional image information.

The preset algorithm may include gradient operation and Hough transform. The gradient operation is used to detect edge information of an image and obtain a gradient map of the image. The Hough transform is used to extract a plurality of straight lines from the generated gradient map. Of course, other algorithms, such as the least square method and the ray method, may also be adopted to extract the straight lines from the gradient map, which is not limited by the embodiment of the present disclosure.

Figure 6:
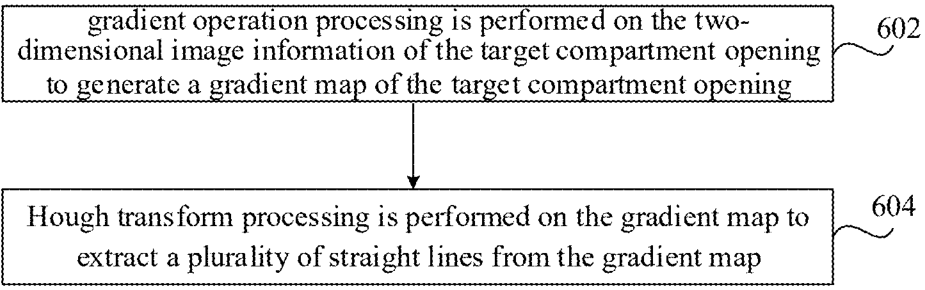
FIG. 6 is a flow chart for extracting a plurality of straight lines according to some embodiments of the present disclosure.

FIG. 6 is a flow chart for extracting a plurality of straight lines according to some embodiments of the present disclosure. As shown in FIG. 6, the method includes the following steps.

In step 602, gradient operation processing is performed on the two-dimensional image information of the target compartment opening to generate a gradient map of the target compartment opening.

In step 604. Hough transform processing is performed on the gradient map to extract a plurality of straight lines from the gradient map.

The image gradient represents the speed of change of the gray value of the image. For an image, a gray value difference between two sides of an edge part of the image is large, and the gradient value is large. Therefore, the information of the image edge may be highlighted by performing the gradient operation on the image. Since pixel values are discrete values, the gradient of the pixel values actually relates to a difference operation, and it is essentially a kind of spatial filtering. By performing the gradient operation processing on the two-dimensional image information of the target compartment opening, the edge information of the two-dimensional image may be highlighted, and thus the gradient map of the target compartment opening may be generated.

The Hough transform is an operation process for feature extraction, which is widely applied in image analysis, computer vision, and digital image processing. The Hough transform is used to identify and find features, such as lines, in objects. The general algorithm process is as follows: first, an object and the type of shape to be identified may be given, and then the algorithm will perform voting in the parameter space to determine the shape of the object, which is determined by the local maximum value in the accumulation space. By performing the Hough transform processing on the gradient map, the plurality of straight lines in the gradient map may be extracted. Moreover, the accuracy and efficiency of extracting straight lines through the Hough transform processing are relatively high, thus improving the accuracy and efficiency of selecting the preset target point.

In step 504, an intersection point between every two straight lines is calculated as a candidate target point.

In step 506, based on preset size information and shape information of the target compartment opening, the preset target point is selected from the candidate target points.

When two straight lines of the plurality of extracted straight lines intersect, the intersection point between the two straight lines may be calculated. After calculating the intersection point between every two straight lines, all the calculated intersection points may serve as the candidate target points.

The connecting lines of the candidate target points may form a plurality of closed areas. Since the target compartment opening is usually rectangular and its size information is also known, the area of the closed area corresponding to the target compartment opening is also definite. Then, through the preset size information and shape information of the target compartment opening, the closed area corresponding to the target compartment opening, that is, the rectangular area corresponding to the target compartment opening, may be determined first, so that the four vertices that make up the rectangular area may be used as the preset target points. Thus, the preset target points are selected from the candidate target points.

In step 404, pixel position information of the preset target point in the two-dimensional image information is used as the first position information.

For example, as shown in FIG. 4B, the pixel position information of the four vertices E1, E2, E3 and E4 of the target compartment opening in the two-dimensional image information may be expressed as: $PE1_{Pixel}$=(u1,v1), $PE2_{Pixel}$=(u2,v2), $PE3_{Pixel}$=(u3,v3), $PE4_{Pixel}$=(u4, v4), respectively, that is, the first position information of the preset target point is obtained.

Figure 7:
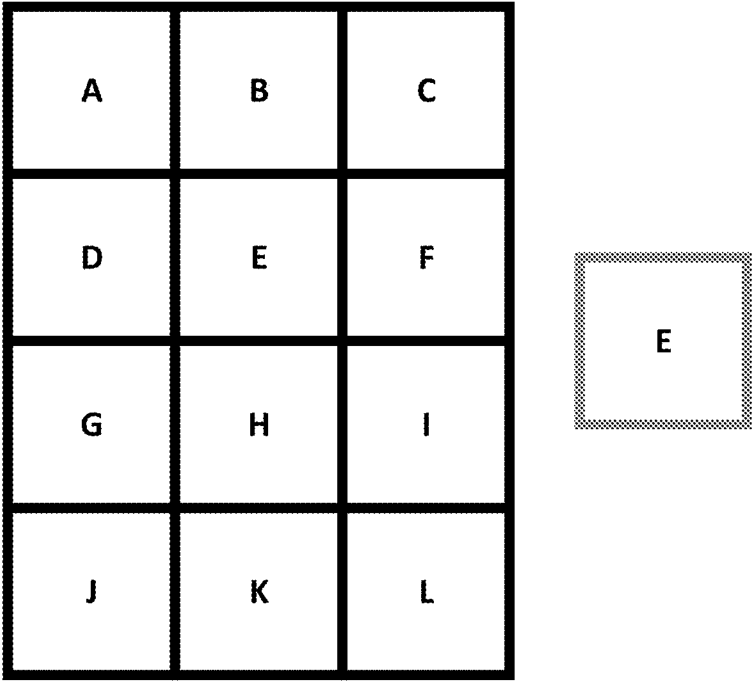
FIG. 7 is a schematic diagram of four sides of a target compartment opening according to some embodiments of the present disclosure.

In some other embodiments, the preset target point may include the center points corresponding to the four sides of the target compartment opening. FIG. 7 is a schematic diagram of four sides of a target compartment opening according to some embodiments of the present disclosure. As shown in FIG. 7, taking an example that the target compartment opening is the compartment opening E. and the target compartment opening E is a rectangle surrounded by four straight lines, that is, the target compartment opening E contains four sides. When the visual scanning device is a 3D camera, the three-dimensional image information of the target compartment opening in the shelf collected by the visual scanning device may be obtained.

Figure 8:
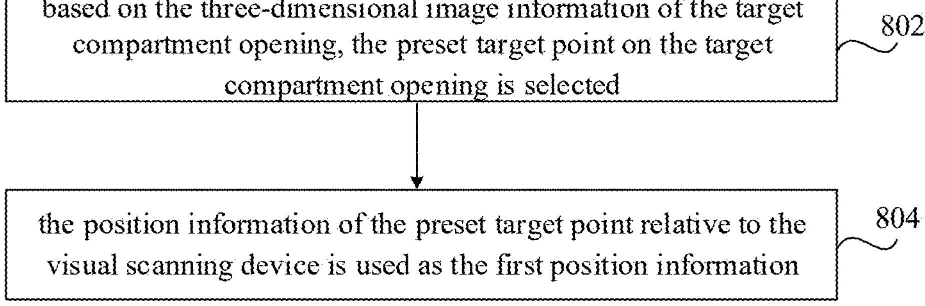
FIG. 8 is another flow chart for calculating first position information according to some embodiments of the present disclosure.

FIG. 8 is another flow chart for calculating first position information according to some embodiments of the present disclosure. As shown in FIG. 8, the method includes the following steps.

In step 802, based on the three-dimensional image information of the target compartment opening, the preset target point on the target compartment opening is selected.

In step 804, the position information of the preset target point relative to the visual scanning device is used as the first position information.

The three-dimensional image information of the target compartment opening may contain the image information of other objects except the compartment opening, so it is necessary to select the center points corresponding to the four sides of the target compartment opening according to the three-dimensional image information.

FIG. 9 is another flow chart for selecting a preset target point according to some embodiments of the present disclosure. As shown in FIG. 9, the method includes the following steps.

In step 902, image processing is performed on the three-dimensional image information of the target compartment opening by using a preset algorithm, and four straight lines constituting the target compartment opening are extracted from the three-dimensional image information.

In an embodiment, the preset algorithm may adopt gradient operation and Hough transform, and the realization way of extracting the four straight lines from the three-dimensional image information may refer to the above process of extracting the plurality of straight lines from the two-dimensional image information of the target compartment opening, which is not repeated here.

In step 904, for each straight line, pixel position information corresponding to a preset number of pixel points around each straight line is obtained.

In step 906, the preset target point is determined based on each pixel position information.

For each straight line, the pixel position information corresponding to a preset number of pixel points around each straight line may be obtained. For example, the pixel position information of five pixel points around each straight line may be obtained. Therefore, after averaging the five pieces of pixel position information, the average value may be used as the pixel position information of the center point corresponding to the straight line, and based on this, the center points corresponding to the four sides of the target compartment opening may be obtained, that is, four center points may be obtained. Further, the position information of the preset target point relative to the visual scanning device may be directly used as the first position information.

In step 206, second position information of the position to be identified in a second coordinate system is obtained.

The second coordinate system is a coordinate system constructed based on the shelf.

In an embodiment, taking an example that the position to be identified includes the visual identification code, continuing to refer to FIG. 3C, a coordinate system XYZ in FIG. 3C is the second coordinate system.

FIG. 10 is a flow chart for calculating second position information according to an embodiment of the present disclosure. As shown in FIG. 10, the method includes the following steps.

In step 1002, the second coordinate system is constructed with a preset point on the shelf as an origin.

In step 1004, the second position information of the position to be identified in the second coordinate system is calculated based on preset size information of the compartment opening in the shelf for placing the target object to be transported.

The preset point may be any predetermined position in the shelf, as shown in FIG. 3C, the preset point may be a vertex in an upper left corner of the four corners of the shelf, so that this vertex may be used as the origin of the second coordinate system, an X axis is established in a horizontal direction, a Y axis is established in a vertical direction, and a Z axis is perpendicular to the X axis and the Y axis, respectively, thus constructing the second coordinate system.

In FIG. 3C, in the preset size information of each compartment opening, a size in the horizontal direction may be represented by N, a size in the vertical direction may be represented by M, and a size in a z-axis direction may be uniformly set to 0, Taking an example that the identifier to be identified includes the visual identification codes at the four corners of the front area of the shelf, the second position information of the four visual identification codes in the second coordinate system may be expressed as follows: $PTAG1_{Shelf}$=(0,0,0). $PTAG2_{Shelf}$=(3N,0,0), $PTAG3_{Shelf}$=(0, 4M,0). $PTAG4_{Shelf}$=(3N,4M,0), respectively.

In some embodiments, taking an example that the identifier to be identified includes the intersection position of the compartment openings in the shelf. i.e. the intersection position of the compartment openings in the front area of the shelf, in order to determine the second position information of each identifier to be identified in the second coordinate system, the image information of the identifier to be identified collected by the visual scanning device may include all the compartment openings in the front area of the shelf. For example, the visual scanning device may be a fisheye camera. After the transfer robot transports the shelf to the workstation, the fisheye camera collects image information including all the compartment openings in the front area of the shelf, and the second position information of the intersection positions of the individual compartment openings in the identifier to be identified in the second coordinate system may be determined through this image information. For another example, after the transfer robot transports the shelf to the workstation, the visual scanning device collects the image information of partial compartment openings in the shelf (for example, compartment openings in an upper half, a lower half, a left half or a right half in the front area of the shelf: for another example, compartment openings in an upper half, a lower half, a left half or a right half in the top area of the shelf), and the second position information of the intersection positions of the individual compartment openings in the identifier to be identified in the second coordinate system may be determined through this image information. For another example, the visual scanning device may also collect a plurality of images including the identifier to be identified during the process of the transfer robot transporting the shelf to the workstation, and the second position information of the intersection positions of the individual compartment openings in the identifier to be identified in the second coordinate system may be determined through the plurality of images.

In an embodiment, taking an example that the position to be identified includes the target compartment opening, the second coordinate system may also be a coordinate system constructed based on the target compartment opening in the shelf. Continuing to refer to FIG. 4B, a coordinate system XY in FIG. 4B is the second coordinate system. When constructing the second coordinate system, the origin of the second coordinate system may be any predetermined position in the target compartment opening. As shown in FIG. 4B, the second coordinate system may be constructed with the vertex E1 of the target compartment opening E as the origin, an X axis may be established in the horizontal direction, a Y axis may be established in the vertical direction, and a size in a Z direction may be set to 0). Thus, a Z axis is not marked in FIG. 4B.

In FIG. 4B, in the preset size information of each compartment opening, a size of the compartment opening in the horizontal direction may be represented by N and a size of the compartment opening in the vertical direction may be represented by M. Therefore, the second position information of the four vertices of the target compartment opening E in the second coordinate system may be expressed as follows: $PE1_{Cell}$=(0,0,0), $PE2_{Cell}$=(N,0,0), $PE3_{Cell}$=(0,M,0). $PE4_{Cell}$=(N,M,0), respectively.

In step 208, a conversion relationship between the first coordinate system and the second coordinate system is calculated based on the first position information and the second position information.

Figure 11:
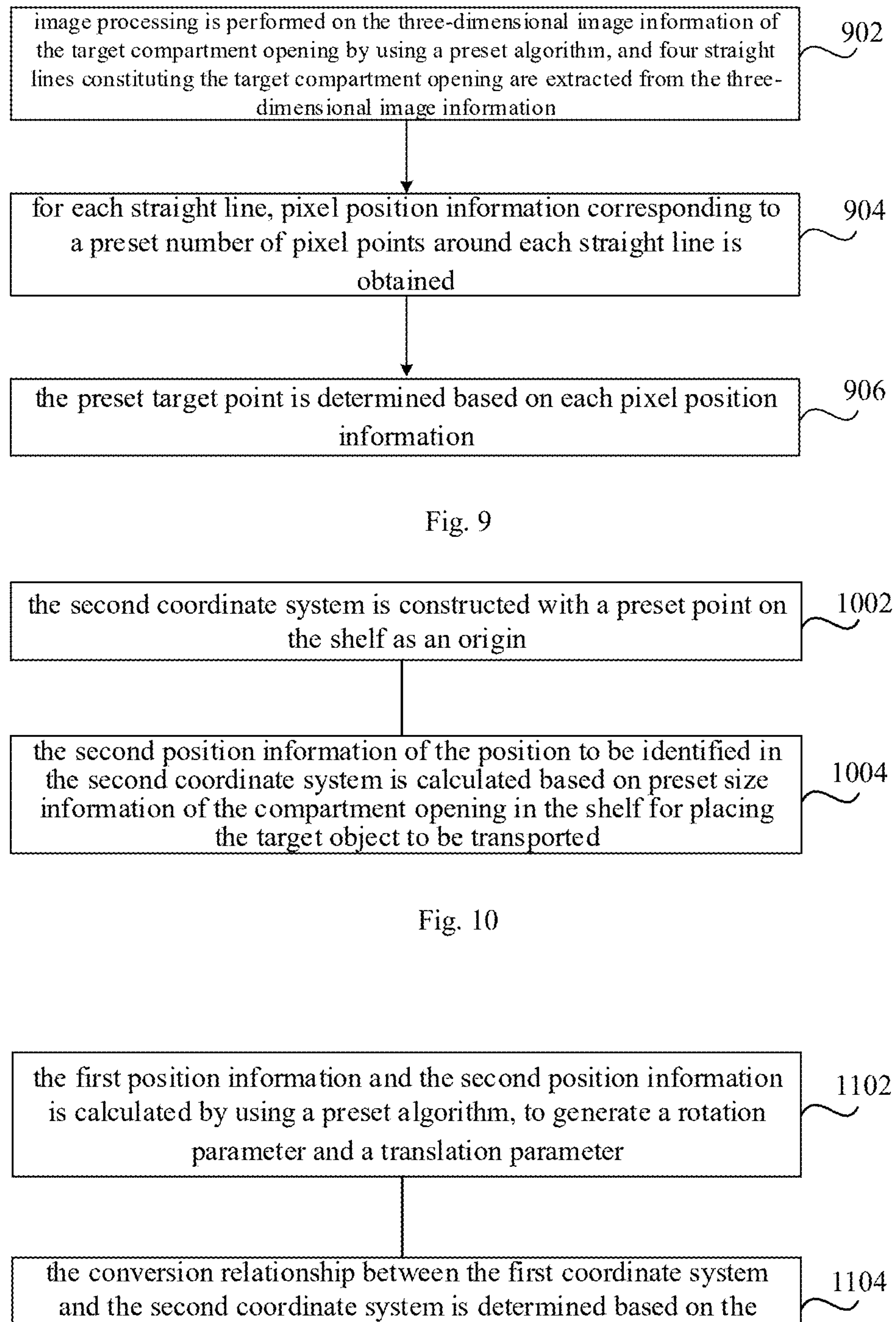
FIG. 11 is a flow chart for calculating a conversion relationship according to some embodiments of the present disclosure.

FIG. 11 is a flow chart for calculating a conversion relationship according to some embodiments of the present disclosure. As shown in FIG. 11, the method includes the following steps.

In step 1102, the first position information and the second position information is calculated by using a preset algorithm, to generate a rotation parameter and a translation parameter.

In step 1104, the conversion relationship between the first coordinate system and the second coordinate system is determined based on the rotation parameter and translation parameter.

In an embodiment, the preset algorithm may be the PnP (Perspective-n-Point) algorithm, which is a corresponding method for solution from 3D points to 2D points. It describes how to estimate the pose of the camera when n 3D spatial points and their positions are known. By substituting four sets of first position information and four sets of second position information into the following formula (1), and then using the PnP algorithm, a rotation parameter R and a translation parameter t may be calculated. This solution process is the prior art, and thus it will not be elaborated here. Thus, based on the rotation parameter R and the translation parameter t, the conversion relationship between the first coordinate system and the second coordinate system may be determined.

$$PTAG_{Camera} = PTAG_{Shelf} R + t \tag{1}$$

$PTAG_{Camera}$ represents the first position information of the position to be identified; $PTAG_{Shelf}$ represents the second position information of the position to be identified: R represents the rotation parameter; and t represents the translation parameter.

In step 210, third position information of at least one target object to be transported on the shelf in the second coordinate system is obtained, fourth position information of the target object to be transported relative to the container picking device is determined based on the third position information and the conversion relationship, and the fourth position information is sent to the control device, so as to trigger the control device to control the mechanical arm to pick up the target object to be transported based on the fourth position information.

For the method of determining the third position information of the target object to be transported in the second coordinate system, reference may be made to the above process of determining the second position information. Taking the target object to be transported placed at the compartment opening E in FIG. 3C as an example, the third position information of the target object to be transported may be expressed as $$PE_{Shelf} = \left(\frac{3}{2}N,\ 2M,\ 0\right).$$

In an embodiment, in a case that the position to be identified is the target compartment opening and the target compartment opening is the compartment opening where the target object to be transported is placed, obtaining the third position information of the at least one target to be transported on the shelf in the second coordinate system includes obtaining the third position information of the target compartment opening on the shelf in the second coordinate system. In some examples, the third position information of the target compartment opening in the second coordinate system may be the same as or different from the second position information of the preset target point on the target compartment opening.

For example, taking an example that the target compartment opening in FIG. 4B is the compartment opening E and the target compartment opening E is the compartment opening for placing the target object to be transported, the third position information of the target compartment opening E may be the position information of E0 in the second coordinate system, which is expressed as $$PE0_{Cell} = \left(\frac{1}{2}N,\ M,\ 0\right),$$

or may also be the position information of E1, E2, E3 or E4 in the second coordinate system.

In an embodiment, in a case that the position to be identified is the target compartment opening and the target compartment opening is different from the compartment opening where the target object to be transported is placed, the third position information of the target object to be transported in the second coordinate system may be obtained through step 210, and the third position information of the target object to be transported in the second coordinate system may be the third position information of any position on the compartment opening where the target object to be transported is placed in the second coordinate system.

Figure 12:
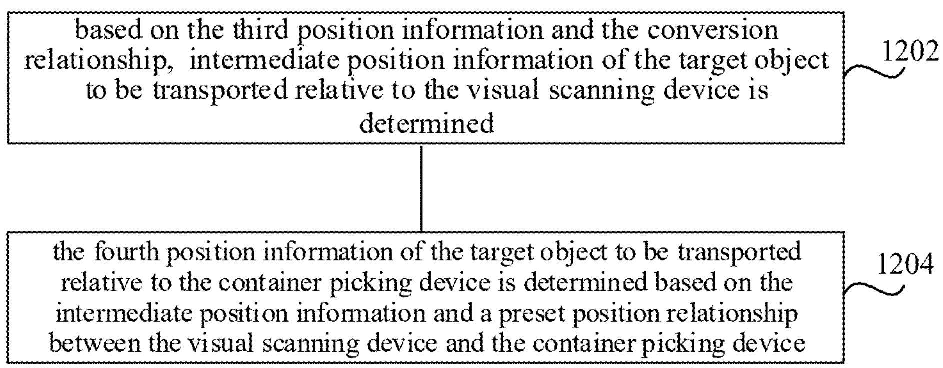
FIG. 12 is a flow chart for determining fourth position information according to some embodiments of the present disclosure.

FIG. 12 is a flow chart for determining fourth position information according to some embodiments of the present disclosure. As shown in FIG. 12, the method includes the following steps.

In step 1202, based on the third position information and the conversion relationship, intermediate position information of the target object to be transported relative to the visual scanning device is determined.

In step 1204, the fourth position information of the target object to be transported relative to the container picking device is determined based on the intermediate position information and a preset position relationship between the visual scanning device and the container picking device.

Continuing to take the target object to be transported placed at the compartment opening E in FIG. 3C as an example, based on the third position information and the conversion relationship, the position information. i.e., the intermediate position information of the target object to be transported relative to the visual scanning device may be calculated by the following formula (2).

$$PE_{Camera} = PE_{Shelf}R + t \tag{2}$$

$PE_{Camera}$ represents the position information (e.g. the intermediate position information) of the target object to be transported placed at the compartment opening E in the first coordinate system, and $PE_{Shelf}$ represents the position information (e.g. the third position information) of the target object to be transported placed at the compartment opening E in the second coordinate system.

Since the visual scanning device is manually installed on the container picking device, the preset position relationship between the visual scanning device and the container picking device is also known, so that the intermediate position information may be converted into the fourth position information of the target object to be transported relative to the container picking device based on the preset position relationship and the intermediate position information calculated by the formula (2).

After calculating and obtaining the fourth position information of the target object to be transported relative to the container picking device, the terminal may send the fourth position information to the control device, and the control device may control the mechanical arm to pick up the target object to be transported based on the fourth position information.

In addition, it should be noted that when multiple target objects to be transported need to be picked up at one time, the fourth position information of each target object to be transported relative to the container picking device may be calculated by the above formula (2), so that all the fourth position information may be sent to the control device, and thus the multiple target objects to be transported may be picked up at one time.

In some embodiments, the method of returning the target object (such as the container) to be transported is similar to the above method, except that when returning the target object to be transported, step 210 obtains the third position information of a storage position for return on the shelf corresponding to the target object to be transported in the second coordinate system, then the fourth position information of the storage position for return relative to the container picking device is determined based on the third position information and the conversion relationship, and the fourth position information is sent to the control device, to trigger the control device to control the mechanical arm to return the target object to be transported based on the fourth position information. Moreover, when the method is adopted to return the target object to be transported, a plurality of the target objects to be transported may be returned at one time.

In the following, the device embodiments corresponding to the aforementioned method embodiments will be introduced.

Figure 13:
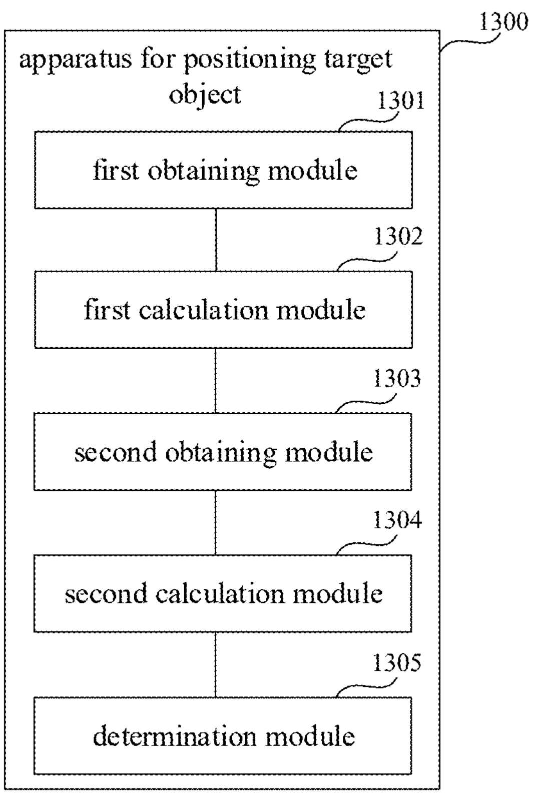
FIG. 13 is a schematic diagram of an apparatus for positioning a target object according to some embodiments of the present disclosure.

Some embodiments of the present disclosure also provide an apparatus for positioning a target object, which is configured to perform the method for positioning the target object in the foregoing embodiments. FIG. 13 is a schematic diagram of an apparatus for positioning a target object according to some embodiments of the present disclosure. As shown in FIG. 13, an apparatus for positioning a target object 1300 includes a first obtaining module 1301, a first calculation module 1302, a second obtaining module 1303, a second calculation module 1304 and a determination module 1305. In addition, the device may also include other more or less units/modules, such as storage units, sending units, etc.

The first obtaining module 1301 is configured to obtain image information of a position to be identified on a shelf collected by a visual scanning device after a transfer robot transports the shelf to a workstation. The position to be identified includes an identifier to be identified and/or a target compartment opening, the identifier to be identified includes at least one of a visual identification codes arranged on the shelf, a corner of the shelf and an intersection position of compartment openings in the shelf, and the number of the visual identification codes arranged on the shelf is less than the number of the compartment openings in the shelf. The target compartment opening includes a compartment opening for placing a target object to be transported.

The first calculation module 1302 is configured to calculate first position information of the position to be identified in a first coordinate system based on the image information of the position to be identified. The first coordinate system is a coordinate system constructed based on the visual scanning device.

The second obtaining module 1303 is configured to obtain second position information of the position to be identified in a second coordinate system. The second coordinate system is a coordinate system constructed based on the shelf.

The second calculation module 1304 is configured to calculate a conversion relationship between the first coordinate system and the second coordinate system based on the first position information and the second position information.

The determination module 1305 is configured to obtain third position information of at least one target object to be transported on the shelf in the second coordinate system, determine fourth position information of the target object to be transported relative to a container picking device based on the third position information and the conversion relationship, and send the fourth position information to a control device, so as to trigger the control device to control a mechanical arm to pick up the target object to be transported based on the fourth position information.

In some embodiments, the identifier to be identified includes four corners of a front area of the shelf, or four corners of a top area of the shelf.

In some embodiments, the identifier to be identified includes an intersection position of compartment openings in a front area of the shelf, or an intersection position of compartment openings in a top area of the shelf.

In some embodiments, the identifier to be identified includes a corner of a front area of the shelf and an intersection position of compartment openings in the front area of the shelf: or, the identifier to be identified includes a corner of a top area of the shelf and an intersection position of compartment openings in the top area of the shelf.

In some embodiments, four or more identifiers to be identified are arranged, and positions of the individual identifiers to be identified are not in a straight line.

In some embodiments, more than four visual identification codes are provided, and the individual visual identification codes are respectively arranged at four corners of a front area of the shelf and at least one preset target position of a top area of the shelf, or the individual visual identification codes are respectively arranged at four corners of a top area of the shelf and at least one preset target position of a front area of the shelf. The preset target position includes a corner position and a center position.

In some embodiments, four visual identification codes are provided, and the individual visual identification codes are respectively arranged at four corners of a front area or a top area of the shelf.

In some embodiments, three visual identification codes are provided, and the individual visual identification codes are respectively arranged at any three corners of a front area or a top area of the shelf: or, two visual identification codes are provided, and the individual visual identification codes are respectively arranged at two corners located at a diagonal in a front area or a top area of the shelf: or, one visual identification code is provided, and the visual identification code is arranged at a center of a front area or a top area of the shelf.

In some embodiments, the position to be identified is the target compartment opening; and the first calculation module 1302 is configured to calculate first position information of a preset target point on the target compartment opening in the first coordinate system based on image information of the target compartment opening.

In an embodiment, the preset target point includes four vertices of the target compartment opening, and the first obtaining module 1301 is configured to obtain two-dimensional image information of the target compartment opening on the shelf collected by the visual scanning device; the first calculation module 1302 is configured to select the preset target point on the target compartment opening based on the two-dimensional image information of the target compartment opening; and pixel position information of the preset target point in the two-dimensional image information is used as the first position information.

In some examples, the first calculation module 1302 is configured to: perform image processing on the two-dimensional image information of the target compartment opening by using a preset algorithm, and extract a plurality of straight lines from the two-dimensional image information: calculate an intersection point between every two straight lines as a candidate target point; and select the preset target point from the candidate target points based on preset size information and shape information of the target compartment opening.

The first calculation module 1302 is configured to: perform gradient operation processing on the two-dimensional image information of the target compartment opening to generate a gradient map of the target compartment opening; and perform Hough transform processing on the gradient map, to extract the plurality of straight lines from the gradient map.

In some embodiments, the preset target point includes center points corresponding to four sides of the target compartment opening, and the first calculation module 1302 is configured to: obtain three-dimensional image information of the target compartment opening on the shelf collected by the visual scanning device: select the preset target point on the target compartment opening based on the three-dimensional image information of the target compartment opening; and use position information of the preset target point relative to the visual scanning device as the first position information.

In an embodiment, the first calculation module 1302 is configured to: perform image processing on the three-dimensional image information of the target compartment opening by using a preset algorithm, and extract four straight lines constituting the target compartment opening from the three-dimensional image information: for each straight line, obtain pixel position information corresponding to a preset number of pixel points around each straight line; and determine the preset target point based on each pixel position information.

In an embodiment, the second calculation module 1304 is configured to: calculate the first position information and the second position information by using a preset algorithm, to generate a rotation parameter and a translation parameter; and determine the conversion relationship between the first coordinate system and the second coordinate system based on the rotation parameter and translation parameter.

In an embodiment, the determination module 1305 is configured to: determine intermediate position information of the target object to be transported relative to the visual scanning device based on the third position information and the conversion relationship; and determine fourth position information of the target object to be transported relative to the container picking device based on the intermediate position information and a preset position relationship between the visual scanning device and the container picking device.

For example, the second obtaining module 1303 is configured to obtain third position information of a compartment opening on the shelf for placing the target object to be transported in the second coordinate system.

In an embodiment, the second obtaining module 1303 is configured to: construct the second coordinate system with the preset target point on the shelf as an origin; and calculate second position information of the visual identification code in the second coordinate system based on preset size information of the compartment opening on the shelf for placing the target object to be transported.

Some embodiments of the present disclosure also provide an electronic device, which may be a server in the aforementioned embodiments and configured to realize all or part of steps of the aforementioned method for positioning the target object.

Figure 14:
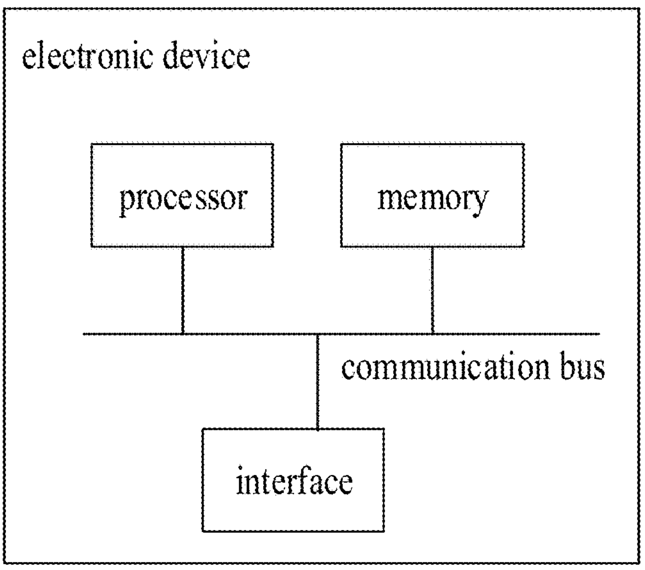
FIG. 14 is a schematic diagram of an electronic device according to some embodiments of the present disclosure.

FIG. 14 is a schematic diagram of an electronic device according to some embodiments of the present disclosure. As shown in FIG. 14, the electronic device includes at least one processor, a memory and at least one interface, and may further include a communication bus for connecting these components.

The at least one processor may be a CPU or a processing chip, and is configured to read and execute computer program instructions stored in the memory, so that the at least one processor may perform the methods in the foregoing embodiments.

The memory may be a non-transitory memory, which may include a volatile memory, such as a high-speed random access memory (RAM), or a non-volatile memory, such as at least one disk memory.

At least one interface includes an input-output (I/O) interface and a communication interface, and the communication interface may be a wired or wireless interface, so as to realize the communication connection between the electronic device and other devices. The I/O interface may be used to connect peripherals, such as a display screen, a keyboard and so on.

Some embodiments of the present disclosure provide a computer device, which includes a memory and a processor, a computer program is stored in the memory, and when the processor executes the compute program, the following steps are realized.

After a transfer robot transports a shelf to a workstation, image information of an identifier to be identified on the shelf collected by a visual scanning device is obtained. The identifier to be identified includes at least one of a visual identification code arranged on the shelf, a corner of the shelf and an intersection position of compartment openings in the shelf, and the number of the visual identification codes arranged on the shelf is less than the number of the compartment openings in the shelf.

Based on the image information of the identifier to be identified, first position information of the identifier to be identified in a first coordinate system is calculated. The first coordinate system is a coordinate system constructed based on the visual scanning device.

Second position information of the identifier to be identified in a second coordinate system is acquired. The second coordinate system is a coordinate system constructed based on the shelf.

Based on the first position information and the second position information, a conversion relationship between the first coordinate system and the second coordinate system is calculated.

Third position information of at least one target object to be transported on the shelf in the second coordinate system is obtained, fourth position information of the target object to be transported relative to a container picking device is determined based on the third position information and the conversion relationship, and the fourth position information is sent to a control device, to trigger the control device to control a mechanical arm to pick up the target object to be transported based on the fourth position information.

In some embodiments, the identifier to be identified includes four corners of a front area of the shelf, or four corners of a top area of the shelf.

In some embodiments, the identifier to be identified includes an intersection position of compartment openings in a front area of the shelf, or an intersection position of compartment openings in a top area of the shelf.

In some embodiments, the identifier to be identified includes a corner of a front area of the shelf and an intersection position of compartment openings in the front area of the shelf: or, the identifier to be identified includes a corner of a top area of the shelf and an intersection position of compartment openings in the top area of the shelf.

In some embodiments, four or more identifiers to be identified are arranged, and positions of the individual identifiers to be identified are not in a straight line.

In some embodiments, more than four visual identification codes are provided, and the individual visual identification codes are respectively arranged at four corners of a front area of the shelf and at least one preset target position of a top area of the shelf, or the individual visual identification codes are respectively arranged at four corners of a top area of the shelf and at least one preset target position of a front area of the shelf. The preset target position includes a corner position and a center position.

In some embodiments, four visual identification codes are provided, and the individual visual identification codes are respectively arranged at four corners of a front area or a top area of the shelf.

In some embodiments, three visual identification codes are provided, and the individual visual identification codes are respectively arranged at any three corners of a front area or a top area of the shelf; or, two visual identification codes are provided, and the individual visual identification codes are respectively arranged at two corners located at a diagonal in a front area or a top area of the shelf: or, one visual identification code is provided, and the visual identification code is arranged at a center of a front area or a top area of the shelf.

In some embodiments, when executing the computer program, the processor also realizes the following steps: calculating the first position information and the second position information by using a preset algorithm, to generate a rotation parameter and a translation parameter; and determining the conversion relationship between the first coordinate system and the second coordinate system based on the rotation parameter and the translation parameter.

In some embodiments, when executing the computer program, the processor also realizes the following steps: determining intermediate position information of the target object to be transported relative to the visual scanning device based on the third position information and the conversion relationship; and determining the fourth position information of the target object to be transported relative to a container picking device based on the intermediate position information and a preset position relationship between the visual scanning device and the container picking device.

In some embodiments, when executing the computer program, the processor also realizes the following steps: constructing the second coordinate system with a preset target point on the shelf as an origin; and calculating the second position information of the identifier to be identified in the second coordinate system based on preset size information of a compartment opening on the shelf for placing the target object to be transported.

The implementation principles and technical effects of the computer device according to some embodiments of the present disclosure are similar to those of the above method embodiments, and will not be described in detail here.

In some embodiments, the memory stores computer-readable program instructions, and when the processor reads and executes the program instructions in the memory, the methods for positioning the target object in the foregoing embodiments may be realized.

In addition, some embodiments of the present disclosure also provide a computer program product for storing computer-readable program instructions, which, when executed by a processor, may realize the methods for positioning the target object in the aforementioned embodiments.

Each embodiment in this specification is described in a related way, the same or similar parts between the embodiments may be referred to each other, and each embodiment focuses on the differences from other embodiments. Especially, for the device embodiments, since they are basically similar to the method embodiments, the description is relatively simple, and the relevant points may be found in part of the description of the method embodiments.

The logic and/or steps represented in the flow chart or described in other ways herein, for example, may be regarded as a sequenced list of executable instructions for realizing logical functions, and may be embodied in any computer-readable medium for use by or in combination with an instruction execution system, apparatus or device (such as a computer-based system, a system including a processor or other systems that may read instructions from the instruction execution system, apparatus or device and execute the instructions).

For the purposes of this specification, a "computer-readable medium" may be any device that may contain, store, communicate, propagate or transmit a program for use by or in combination with an instruction execution system, apparatus or device.

More specific examples (non-exhaustive list) of computer-readable media include: an electrical connection part (electronic device) with one or more wires, a portable computer disk box (magnetic device), a random access memory (RAM), a read-only memory (ROM), an erasable and editable read-only memory (EPROM or flash memory), an optical fiber device, and a portable CD-ROM.

In addition, the computer-readable medium may even be paper or other suitable media on which the program may be printed, because the program may be obtained electronically by, for example, optically scanning the paper or other media, followed by editing, interpreting or otherwise processing if necessary, and then stored in the computer memory. It should be understood that various parts of the present disclosure may be implemented in hardware, software, firmware, or a combination thereof.

In the above embodiments, a plurality of steps or methods may be realized by software or firmware stored in a memory and executed by an appropriate instruction execution system. For example, if it is implemented in hardware, as in another embodiment, it may be implemented by any one of the following technologies or their combination: a discrete logic circuit with a logic gate for implementing a logic function on a data signal, an application specific integrated circuit with a suitable combinational logic gate, a programmable gate array (PGA), a field programmable gate array (FPGA), and the like.

The above embodiments of the present disclosure do not constitute a limitation on the protection scope of the present disclosure.

The invention claimed is:

1. A method for positioning a container, performed by a terminal, the terminal being respectively coupled with a control device and a visual scanning device on a container picking device, the control device being coupled with a mechanical arm on the container picking device, and the method comprising:

obtaining image information of an identifier to be identified on a shelf collected by the visual scanning device after a transfer robot transports the shelf to a workstation, wherein the identifier to be identified comprises at least one of a visual identification code arranged on the shelf, a corner of the shelf and an intersection position of compartment openings in the shelf, and the number of visual identification codes arranged on the shelf is smaller than the number of the compartment openings in the shelf;

calculating first position information of the identifier to be identified in a first coordinate system based on the image information of the identifier to be identified, wherein the first coordinate system is a coordinate system constructed based on the visual scanning device;

obtaining second position information of the identifier to be identified in a second coordinate system, wherein the second coordinate system is a coordinate system constructed based on the shelf;

calculating a conversion relationship between the first coordinate system and the second coordinate system based on the first position information and the second position information; and obtaining third position information of at least one container to be transported on the shelf in the second coordinate system, determining fourth position information of the container to be transported relative to the container picking device based on the third position information and the conversion relationship, and sending the fourth position information to the control device, to trigger the control device to control the mechanical arm to pick up the container to be transported based on the fourth position information.

2. The method for positioning the container according to claim 1, wherein four or more identifiers to be identified are arranged, and positions of four or more individual identifiers to be identified are not in a straight line.

3. The method for positioning the container according to claim 1, wherein the identifier to be identified comprises four corners of at least one of a front area or a top area of the shelf.

4. The method for positioning the container according to claim 1, wherein the identifier to be identified comprises an intersection position of compartment openings in at least one of a front area or a top area of the shelf.

5. The method for positioning the container according to claim 1, wherein the identifier to be identified comprises a corner of at least one of a front area or a top area of the shelf and an intersection position of compartment openings in the at least one of the front area or the top area of the shelf.

6. The method for positioning the container according to claim 1, wherein the identifier to be identified comprises more than four visual identification codes, and the more than four visual identification codes are respectively arranged at four corners of one of a front area and a top area of the shelf and at least one preset target position of the other one of the front area and the top area of the shelf.

7. The method for positioning the container according to claim 1, wherein the identifier to be identified comprises four visual identification codes, and the four visual identification codes are arranged at four corners of at least one of a front area or a top area of the shelf, respectively.

8. The method for positioning the container according to claim 1, wherein the identifier to be identified comprises at least one of:

three visual identification codes arranged at any three corners of at least one of a front area or a top area of the shelf, respectively;

two visual identification codes arranged at two corners at a diagonal of at least one of a front area or a top area of the shelf, respectively; or one visual identification code arranged at a center of at least one of a front area or a top area of the shelf.

9. The method for positioning the container according to claim 1, wherein calculating the conversion relationship between the first coordinate system and the second coordinate system based on the first position information and the second position information comprises:

calculating the first position information and the second position information by adopting a preset algorithm, to generate a rotation parameter and a translation parameter; and determining the conversion relationship between the first coordinate system and the second coordinate system based on the rotation parameter and the translation parameter.

10. The method for positioning the container according to claim 1, wherein determining the fourth position information of the container to be transported relative to the container picking device based on the third position information and the conversion relationship comprises:

determining intermediate position information of the container to be transported relative to the visual scanning device based on the third position information and the conversion relationship; and determining the fourth position information of the container to be transported relative to the container picking device based on the intermediate position information and a preset position relationship between the visual scanning device and the container picking device.

11. The method for positioning the container according to claim 1, wherein obtaining the second position information of the identifier to be identified in the second coordinate system comprises:

constructing the second coordinate system with a preset point on the shelf as an origin; and calculating the second position information of the identifier to be identified in the second coordinate system based on preset size information of the compartment opening on the shelf for placing the container to be transported.

12. An electronic device, comprising:

a memory configured to store computer-executable instructions; and a processor configured to read the instructions from the memory and execute the instructions to:

obtain image information of an identifier to be identified on a shelf collected by a visual scanning device after a transfer robot transports the shelf to a workstation, wherein the identifier to be identified comprises at least one of a visual identification code arranged on the shelf, a corner of the shelf and an intersection position of compartment openings in the shelf, and the number of visual identification codes arranged on the shelf is smaller than the number of the compartment openings in the shelf;

calculate first position information of the identifier to be identified in a first coordinate system based on the image information of the identifier to be identified, wherein the first coordinate system is a coordinate system constructed based on the visual scanning device;

obtain second position information of the identifier to be identified in a second coordinate system, wherein the second coordinate system is a coordinate system constructed based on the shelf;

calculate a conversion relationship between the first coordinate system and the second coordinate system based on the first position information and the second position information; and obtain third position information of at least one container to be transported on the shelf in the second coordinate system, determining fourth position information of the container to be transported relative to a container picking device based on the third position information and the conversion relationship, and sending the fourth position information to a control device, to trigger the control device to control a mechanical arm to pick up the container to be transported based on the fourth position information.

13. A non-transitory computer-readable storage medium, storing computer program instructions which, when read by a computer, cause the computer to:

obtain image information of an identifier to be identified on a shelf collected by a visual scanning device after a transfer robot transports the shelf to a workstation, wherein the identifier to be identified comprises at least one of a visual identification code arranged on the shelf, a corner of the shelf and an intersection position of compartment openings in the shelf, and the number of visual identification codes arranged on the shelf is smaller than the number of the compartment openings in the shelf;

calculate first position information of the identifier to be identified in a first coordinate system based on the image information of the position to be identified, wherein the first coordinate system is a coordinate system constructed based on the visual scanning device;

obtain second position information of the identifier to be identified in a second coordinate system, wherein the second coordinate system is a coordinate system constructed based on the shelf;

calculate a conversion relationship between the first coordinate system and the second coordinate system based on the first position information and the second position information; and obtain third position information of at least one container to be transported on the shelf in the second coordinate system, determining fourth position information of the container to be transported relative to a container picking device based on the third position information and the conversion relationship, and sending the fourth position information to a control device, to trigger the control device to control a mechanical arm to pick up the container to be transported based on the fourth position information.

* * * * *